UNITED STATES PATENT OFFICE.

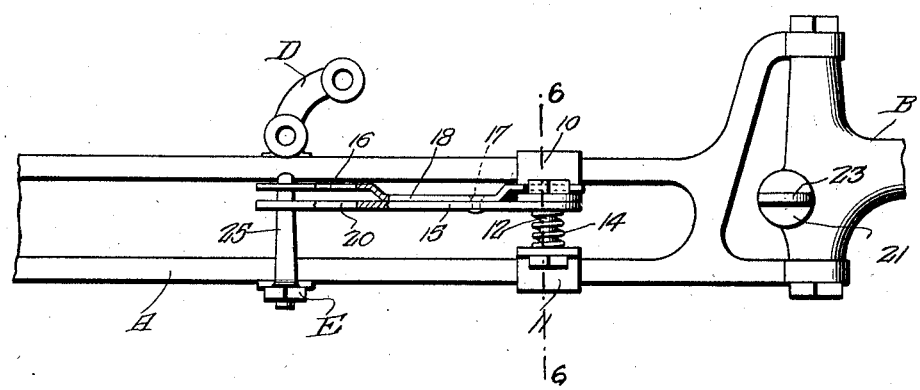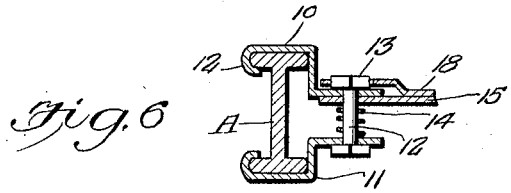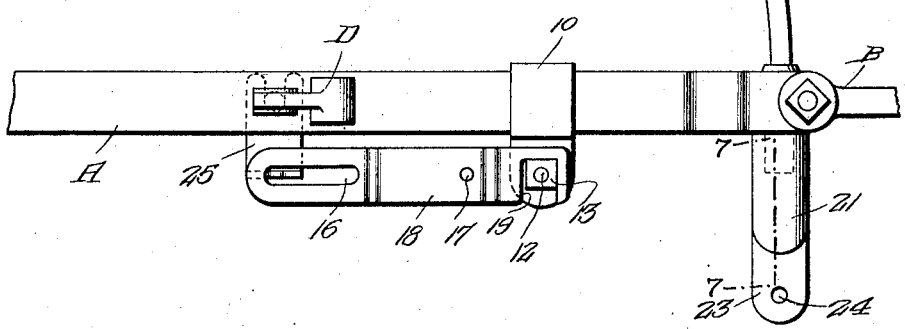

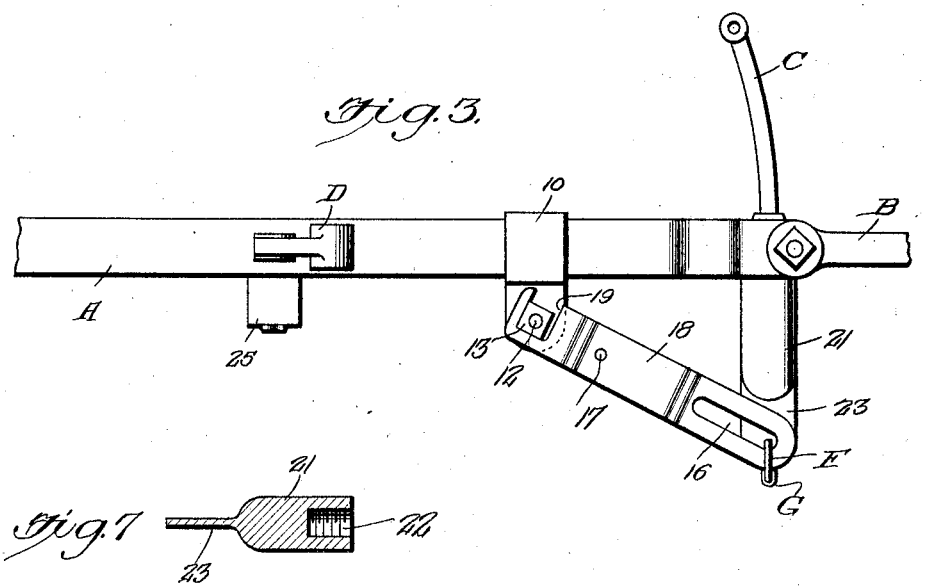
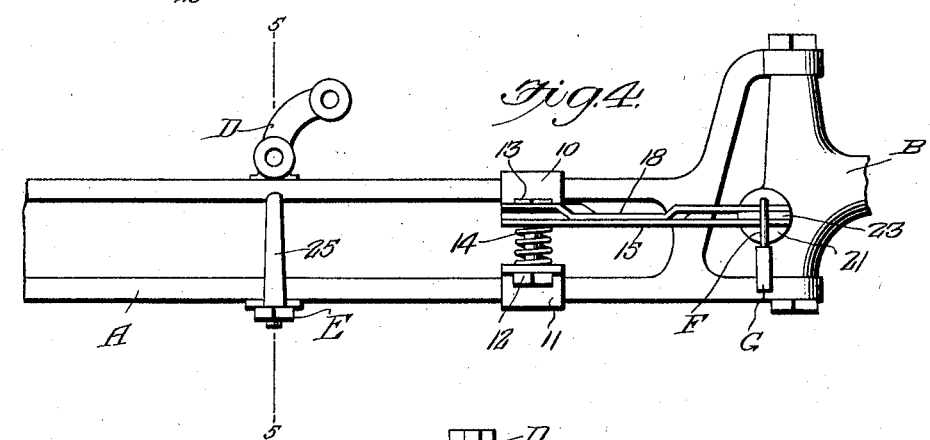
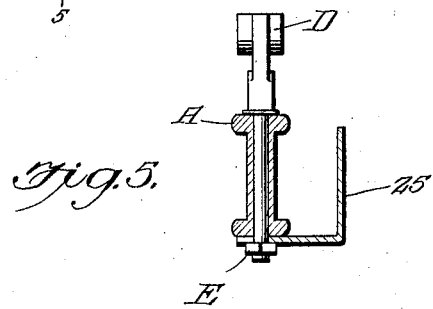

FRANKLIN E. ROUSH, OF DAYTON, OHIO.

AUTOMOBILE-LOCK.

1,387,314.  Specification of Letters Patent.  Patented Aug. 9, 1921.

Application filed July 10, 1920. Serial No. 395,200.

*To all whom it may concern:*

Be it known that I, FRANKLIN E. ROUSH, a citizen of United States, residing at Dayton, in the county of Montgomery, and State of Ohio, have invented new and useful Improvements in Automobile-Locks, of which the following is a specification.

This invention relates to safety devices for motor vehicles and has for its object the provision of a locking device adapted to be carried upon the front axle of the automobile and connected with the steering spindle arm in such a way as to permit of a very limited movement thereof so that the automobile may be moved by hand in case of necessity, the locking device being so constructed that it will prevent steering of the automobile so that theft will be prevented.

An important object is the provision of a device of this character which is formed as a distinct device in itself and which is adapted to be attached to an automobile without making any alteration in the construction.

Another object is the provision of a device of this character which will be comparatively simple and inexpensive in manufacture, highly efficient in use, easy to apply, durable in service and a general improvement in the art.

With the above and other objects and advantages in view, the invention consists in the details of construction, to be hereinafter more fully described and claimed, and illustrated in the accompanying drawings, in which, Figure 1 is a front elevation of my device in position upon the front axle of an automobile and showing it in inoperative or unlocked position.

Fig. 2 is a plan view with the parts in inoperative position.

Fig. 3 is a plan view showing the device in locking position.

Fig. 4 is a front elevation thereof.

Fig. 5 is a detail cross sectional view on the line 5—5 of Fig. 1.

Fig. 6 is a detail sectional view on the line 6—6 of Fig. 1, and

Fig. 7 is a detail sectional view on the line 7—7 of Fig. 2.

Referring to the drawings in detail, the letter A designates the front axle of an automobile, B the steering spindle, C the steering spindle arm ordinarily secured to the spindle by a nut, D one of the front spring hangers and E the nut for holding the hanger in place.

In carrying out my invention I provide a clamping device adapted for engagement upon the front axle A and this clamping device includes upper and lower clamping members 10 and 11 respectively, which are formed of suitable metallic plates having flanges 12 engaging around the rim of the axle. These plates are connected by a suitable bolt 12 carrying a nut 13 and a coil spring 14 surrounds the bolt as shown for the purpose of preventing rattling of the parts. Pivotally engaged upon the bolt 12 is one end of an elongated bar 15 which is disposed below the clamping plate 10 and which has its other end formed with an elongated slot 16 as clearly shown. The spring 14 above referred to abuts the lower clamping plate 11 and against the underside of this bar 15.

Disposed upon the top of the bar 15 and pivotally connected therewith as shown at 17 is a bar 18 which has one end formed with a notch 19 for engagement with the nut 13 so as to lock the nut against movement. This notched end of the bar 18 is upwardly offset as clearly shown so as to be disposed above the clamping plate 10 and the other end of the bar 18 is also upwardly offset so as to provide a space between it and the bar 15 for a purpose to be described. This second named end of the bar 18 is formed with an elongated slot 20 adapted to register with the slot 16 in the bar 15.

In the carrying out of my invention I remove the nut which commonly holds the steering spindle arm C in position, and in lieu of the nut thread onto the threaded end of the spindle arm a rod 21 which is formed in one end with a threaded socket 22 and which has its other end reduced to form an ear 23 which is adapted to be disposed between the free end of the bar 15 and the offset outer end of the bar 18. This ear 23 is provided with a hole 24 adapted to be brought into registration with the slots 16 and 20.

In order to support my device properly when its use is not desired, I employ a hook 25 which is engaged upon the lower end of the spring hanger D, it being understood of course that the nut E must first be removed, and this hook is held in position by the nut E which is afterward screwed into place. When the parts are in inoperative or unlocked position the bars 15 and 18 are swung so that the slots 16 and 20 therein may be engaged upon the hook 25 as clearly shown in Figs. 1 and 2.

When it is desired to lock the automobile, it is merely necessary to slightly lift the bars 15 and 18 together and swing them so that their slotted ends will engage upon opposite sides of the ear 23. The hole 24 in the ear 23 will then register with the slots 16 and 20 and in order to hold the parts in this position I pass through the registering hole and slot the shackle F of any ordinary padlock G. When the automobile is thus locked it will be seen that very limited movement of the steering wheels may be had in order to move the car by hand in case of necessity while at the same time it will be readily apparent that the automobile could not be steered sufficiently to permit its being run by a perspective or would-be thief. When the parts are in this locked position, it will be seen that the notch 19 in the bar 18 will engage the nut 13 and prevent the nut from being unscrewed so as to render the lock inoperative.

From the foregoing description and a study of the drawings, it will be apparent that I have thus provided a very simply constructed and easily installed locking device for automobiles which will effectively prevent steering of the vehicle so that theft will be prevented. It will also be apparent that the device is so constructed that it will be easily and properly supported when its use is not desired, the parts being furthermore so arranged that when in inoperative position it will be impossible to remove the bolts which hold the device to the axle.

While I have shown and described the preferred embodiment of my invention, it will of course be readily understood that I reserve the right to make such changes in the form, construction, and arrangement of parts as will not depart from the spirit of the invention or the scope of the subjoined claims.

What I claim is:

1. An automobile locking device comprising a pair of clamping plates engaged upon the front axle of an automobile, a bolt passing through and securing said plates together, a bar pivotally engaged upon said bolt beneath the upper of said plates and having its free end formed with a longitudinal slot, a second bar pivoted upon the first named bar intermediate the ends thereof and having one end notched for engagement with the head of said bolt, the other end of said second named bar being provided with a longitudinal slot adapted to register with the first named slot, a rod secured to one of the steering spindle arms and formed with an ear disposable between the free ends of said first and second named bars, said ear being provided with a hole registering with the slots in said bars for the passage of a shackle of a padlock.

2. An automobile locking device comprising a clamping member detachably engaged upon the front axle of an automobile, a pair of bars pivoted with respect to said clamping member and carried thereby, the free ends of said bars being spaced apart and being provided with registering slots, means carried by the axle and engageable within said slots, whereby to hold said bars in inoperative position against the front of the axle, and a rod having a threaded socket engaged upon the threaded end of the steering spindle arm, said rod terminating in an ear provided with a hole adapted to be received between the free ends of said bars in registration with the slots therein, said hole and said slots being adapted to receive the shackle of a padlock.

In testimony whereof I affix my signature.

FRANKLIN E. ROUSH.